P. RASMUSSEN.
POTATO DIGGER.
APPLICATION FILED JUNE 5, 1915.

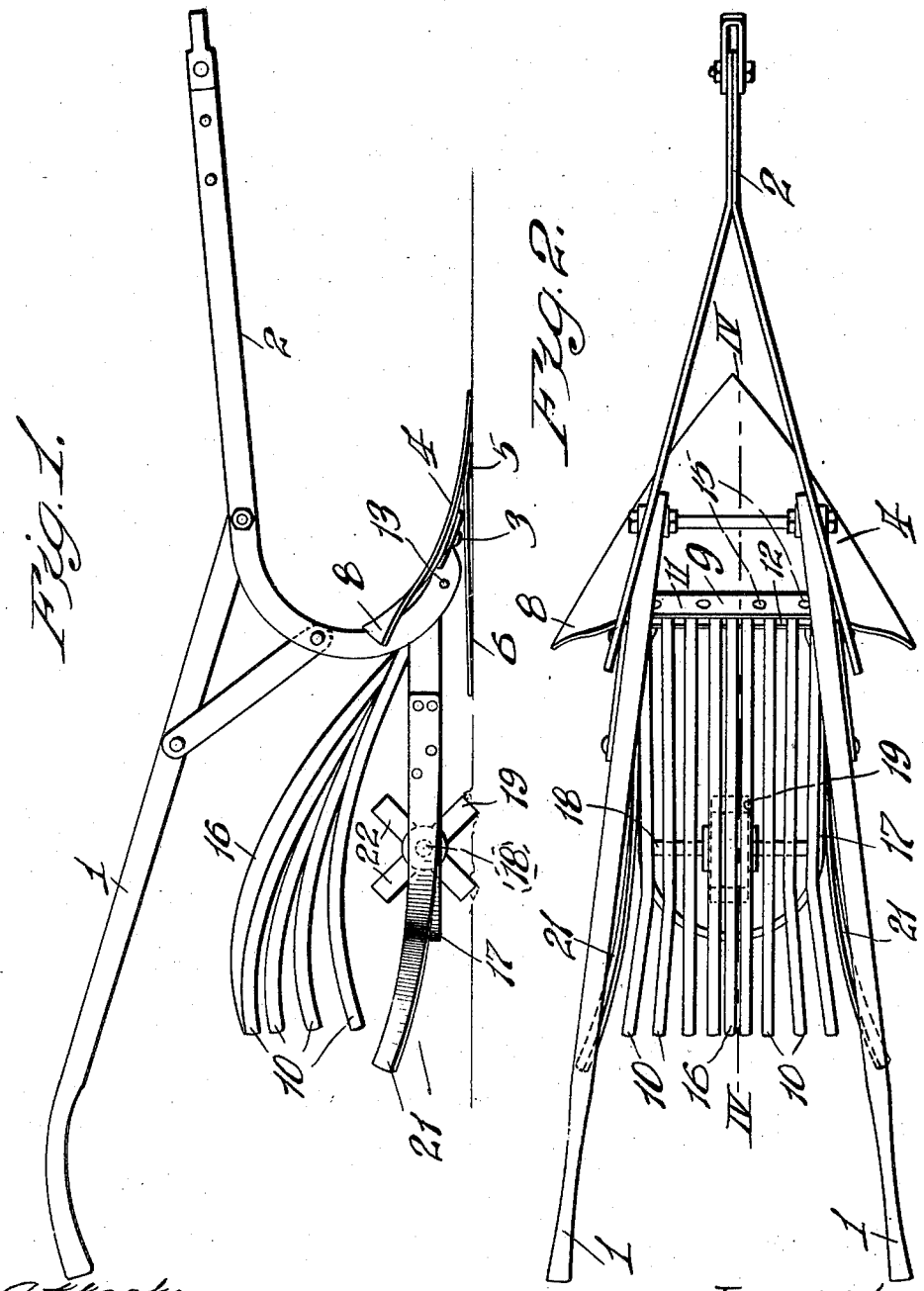

1,315,410.

Patented Sept. 9, 1919.
2 SHEETS—SHEET 2.

Attest:
R. H. Merryman
H. A. Kersting

Inventor:
Peter Rasmussen.
By Knight Bros.
attys.

UNITED STATES PATENT OFFICE.

PETER RASMUSSEN, OF WEBSTER GROVES, MISSOURI, ASSIGNOR OF THREE-FOURTHS TO MARTIN J. RASMUSSEN AND ONE-FOURTH TO WILLIAM J. RASMUSSEN, BOTH OF WEBSTER GROVES, MISSOURI.

POTATO-DIGGER.

1,315,410.     Specification of Letters Patent.      Patented Sept. 9, 1919.

Application filed June 5, 1915. Serial No. 32,283.

*To all whom it may concern:*

Be it known that I, PETER RASMUSSEN, a citizen of the United States of America, and a resident of Webster Groves, in the county of St. Louis and State of Missouri, have invented certain new and useful Improvements in Potato-Diggers, of which the following is a specification.

The primary object of this invention is to provide improved agitating means in connection with the spreading or shaking prongs of a potato digger.

Another object is to provide the shovel of a potato digger with improved casting off blades for throwing, which are adapted to throw the sides of a hill or potato row to one side.

Another object is to provide a potato digger with an improved center share or row splitter.

Other and further objects will appear in the specification, and be specifically pointed out in the appended claims, reference being had to the accompanying drawings exemplifying the invention, and in which:

Figure 1 is a side elevation of this improved potato digger.

Fig. 2 is a plan view of Fig. 1.

Figure 3:
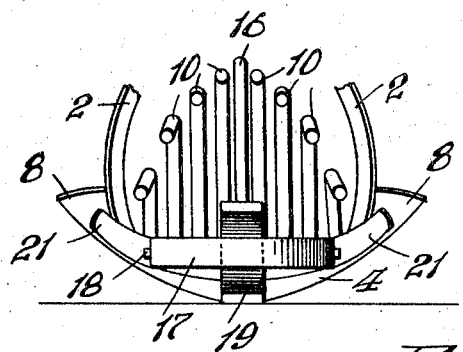
Fig. 3 is a rear elevation, parts of the beams and all of the upper structure being broken away.
Figure 4:
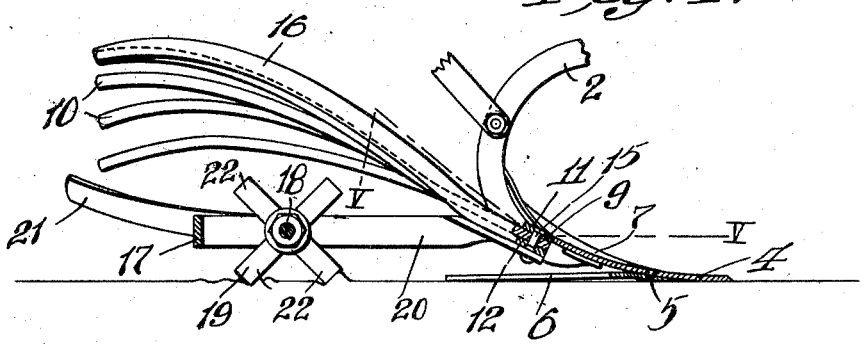
Fig. 4 is a longitudinal section taken on the line IV—IV, Fig. 2.

Referring to the drawings: 1 designates the handles, which are secured at one end to the side beams 2, the lower ends of said beams being secured at 3 to the shovel 4. Secured to said shovel at 5 is a central support 6, which is adapted to hold the digger in an upright position. The shovel 4 has a depressed, or dish-shaped, central portion 7. Extending rearwardly from said shovel, on each side thereof, is a casting-off blade 8. Located between said blades is a prong supporting frame 9, said frame supporting a series of spreading or shaking prongs 10. This frame comprises an upper cross member 11, and a lower cross member 12. Said member 12 has a pintle 13 formed at each end, each of said pintles being swingingly mounted in the lower end of the beams 2.

Figure 5:
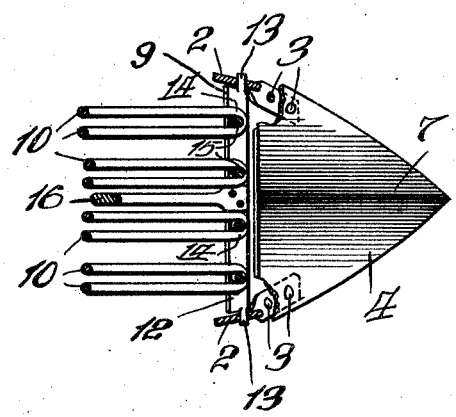
Fig. 5 is a horizontal section taken on the line V—V, Fig. 4.
Figure 6:
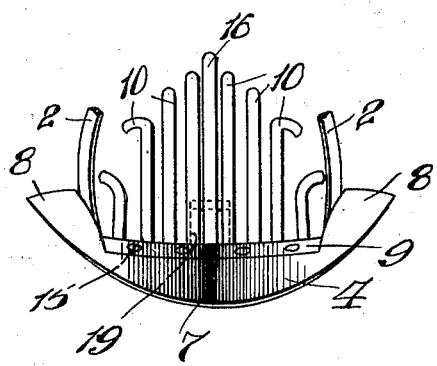
Fig. 6 is a front elevation, parts of the beams and upper structure not shown.

As shown more clearly in Fig. 5, these prongs 10 are constructed in pairs, there being a return bend 14 formed on each pair of prongs. Said bent portion of each pair is mounted between the cross members 11 and 12, there being a bolt or rivet 15 for holding each pair of prongs in position. Said bolts also clamp said cross members and prongs together. Centrally located between the middle sets of prongs 10 is a central share 16, the lower end of said share also being secured between the cross members 11 and 12.

Horizontally arranged and secured to the under side of the cross member 12 is a U-frame 17. Transversely and horizontally supported in said frame is a revolubly mounted shaft 18. Secured to said shaft, intermediate of its ends, is an agitating member 19, in the form of a star wheel. Secured to each side frame 20 of the U-frame 17 is a flat spreading prong 21. Each of said prongs is flared outwardly and upwardly adjacent its rear end.

From the aforesaid description, it is readily seen that the prongs 10, center share 16, U-frame 17, and agitating member 19 are secured to the cross members 11 and 12, said cross member 12 being swingingly secured to the beams 2 by the pintles 13. With this arrangement, all of the aforesaid parts will have a swinging movement relative to the shovel 4.

In the operation of this improved digger, when a potato row is engaged, and the digger is moved therealong, the central portion of the potato row will be fed by the central dish-shaped portion 7 of said shovel onto the inclined prongs 10, whereas, the sides of the potato hills or row will be engaged against the casting-off blades 8. Therefore, such portions of the row that engage said casting-off blades will be thrown aside and not carried upwardly on the prongs 10. These blades, therefore, operate for deflecting the superfluous dirt that is not required to be scattered during the potato digging operation.

As the central portion of the potato row is mounting up the inclined prongs 10, the center share 16, which is arranged longitudinally of, and extends above said prongs will split and divide the row, thereby casting an approximately equal portion of the earth on each side of the center share. As the digger is moved along, the blades 22 of the agitating member 19 will stick in the earth. As said member is revolved from contact with the earth, said blades will serve as lifting members, thereby elevating the U-frame 17, as well as the shaking prongs 10, which action will agitate the earth from the potato row that is on said prongs, thereby scattering the earth and disclosing the potatoes.

What I claim is:

1. In a potato digger, a forwardly arranged shovel, a turnably mounted supporting frame located to the rear of said shovel, a plurality of upwardly and rearwardly inclining prongs carried by said frame, a pair of side members extending from said frame arranged beneath said prongs and providing a support for a shaft mounted therebetween, and a revolving agitating member having a plurality of ground engaging prongs mounted on said shaft.

2. A potato digger comprising a forwardly arranged shovel, a turnable frame mounted to the rear of said shovel composed of a pair of transversely arranged cross members, a plurality of U-shaped prongs clamped between said members inclining upwardly and extending rearwardly therefrom, an agitating member support extending rearwardly from said frame, revolubly supporting an agitating member, said agitating member carrying a plurality of ground engaging prongs so that said supporting frame and prongs extending therefrom will be given an upward and downward movement as said agitating member is revolved.

3. In a potato digger, a shovel, an inclined earth receiving member swingingly connected to said shovel, a revolubly mounted agitating member carried by said earth receiving member, prongs secured to said earth receiving member arranged above said agitating member, said agitating member having ground engaging projections formed thereon, said agitating member when revolved adapted to swing said earth receiving member.

4. In a potato digger, a shovel, an earth receiving member comprising a plurality of upwardly inclined prongs swingingly connected to said shovel, an axis carried by said earth receiving member, a revoluble agitating member mounted on said axis having ground engaging projecting portions located beneath said prongs of said earth receiving member, said projecting portions of said agitating member adapted to engage the ground when the potato digger is moved, said projecting portions adapted to elevate and lower said axis, thereby causing said earth receiving member to be agitated.

PETER RASMUSSEN.

In the presence of—
M. J. RASMUSSEN,
H. G. FLETCHER.

Copies of this patent may be obtained for five cents each, by addressing the "Commissioner of Patents, Washington, D. C."